United States Patent
Hirai et al.

(10) Patent No.: US 9,813,983 B2
(45) Date of Patent: Nov. 7, 2017

(54) WIRELESS COMMUNICATION SYSTEM, AND WIRELESS COMMUNICATION METHOD IN WIRELESS COMMUNICATION SYSTEM

(71) Applicant: PANASONIC INTELLECTUAL PROPERTY MANAGEMENT CO., LTD., Osaka (JP)

(72) Inventors: Katsuhiro Hirai, Fukuoka (JP); Shinji Fukuda, Fukuoka (JP); Takashi Yamamoto, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 139 days.

(21) Appl. No.: 14/854,107

(22) Filed: Sep. 15, 2015

(65) Prior Publication Data
US 2016/0088553 A1 Mar. 24, 2016

(30) Foreign Application Priority Data
Sep. 24, 2014 (JP) .................. 2014-193266

(51) Int. Cl.
*H04J 3/06* (2006.01)
*H04W 52/02* (2009.01)
(Continued)

(52) U.S. Cl.
CPC ..... *H04W 52/0203* (2013.01); *H04M 11/025* (2013.01); *H04N 7/186* (2013.01);
(Continued)

(58) Field of Classification Search
None
See application file for complete search history.

(56) References Cited

U.S. PATENT DOCUMENTS

2007/0066300 A1   3/2007  Nishimura et al.
2011/0052165 A1*  3/2011  Watanabe .............. G03B 17/00
                                                                        396/56
(Continued)

FOREIGN PATENT DOCUMENTS

EP        1613040        1/2006
EP        2602945        6/2013
(Continued)

OTHER PUBLICATIONS

The Extended European Search Report dated Feb. 12, 2016 for the related European Patent Application No. 15184213.5.

*Primary Examiner* — Anh-Vu Ly
(74) *Attorney, Agent, or Firm* — Greenblum & Bernstein, P.L.C.

(57) ABSTRACT

In a wireless communication system, a master device includes a wireless communicator that performs wireless communication with the slave device, a power supply that supplies power to each unit of the master device, an interrupt detector that detects various interrupts, and a controller that controls the entire master device, the interrupt detector supplies power from the power supply to each unit when detecting the interrupt, and the controller performs control to continuously transmit a capture signal to the slave device that waits for reception at a reception timing of a first predetermined interval, via the wireless communicator for time longer than the first predetermined interval when the detected interrupt is an interrupt that requests signal transmission to the slave device, and control to await a capture signal transmitted from the slave device through the wireless communicator when the detected interrupt is a timer interrupt occurring at a second predetermined interval.

5 Claims, 8 Drawing Sheets

(51) Int. Cl.
*H04M 11/02* (2006.01)
*H04N 7/18* (2006.01)
*H04W 84/20* (2009.01)

(52) U.S. Cl.
CPC ... *H04W 52/0212* (2013.01); *H04W 52/0235* (2013.01); *H04W 84/20* (2013.01); *Y02B 60/50* (2013.01)

(56) References Cited

U.S. PATENT DOCUMENTS

| | | | | |
|---|---|---|---|---|
| 2013/0121223 A1* | 5/2013 | Sugitani | ................ | H04W 52/02 370/311 |
| 2013/0121224 A1* | 5/2013 | Sugitani | ................ | H04J 3/1694 370/311 |
| 2013/0137422 A1* | 5/2013 | Sugitani | ............ | H04W 52/0241 455/425 |
| 2014/0104038 A1 | 4/2014 | Hokazono et al. | | |
| 2014/0244063 A1* | 8/2014 | Davis | ................ | H05B 37/0272 700/297 |

FOREIGN PATENT DOCUMENTS

| | | |
|---|---|---|
| EP | 2722832 | 4/2014 |
| EP | 2882058 | 6/2015 |
| JP | 2003-087180 | 3/2003 |
| JP | 2011-117150 | 6/2011 |
| JP | 2014-082615 | 5/2014 |
| JP | 2014-143917 | 8/2014 |
| WO | 2010/097965 | 9/2010 |

\* cited by examiner

WIRELESS COMMUNICATION SYSTEM, AND WIRELESS COMMUNICATION METHOD IN WIRELESS COMMUNICATION SYSTEM

BACKGROUND OF THE INVENTION

1. Field of the Invention

The present invention relates to a wireless communication system, and a wireless communication method in the wireless communication system.

2. Description of the Related Art

Awareness of crime prevention has improved year by year. In recent years, a demand for the realization of entrance monitors or the like through simple installation at a low cost even in single occupant households such as detached houses as well as studio apartments is increasing.

According to such a demand for the simple installation at a low cost, an entrance monitor in which a slave device of the entrance monitor or a master device of the entrance monitor is driven by a battery, and both of the devices are caused to perform wireless communication, making wiring work unnecessary, has begun to spread. In this case, since work for battery replacement occurs when the battery lifetime of the battery mounted on the slave device or the monitor master device expires, there is a need for a wireless communication system for reducing power consumption.

As a method of implementing reduction of power consumption of such a wireless communication system, a wireless communication technology in which a called station repeats regular reception, and a calling station continuously transmits a capture signal longer than an interval of the regular reception of the called station to transition to a constant operation, disclosed in, for example, Japanese Patent Unexamined Publication No. 2003-087180, is known.

Further, technology of a wireless master device (calling device) for suppressing useless continuous transmission when a call signal is continuously transmitted to an intermittently receiving wireless slave device (locator) so as to establish synchronization of transmission and reception, disclosed in, for example, Japanese Patent Unexamined Publication No 2014-082615, is known.

However, although the technology disclosed in Japanese Patent Unexamined Publication No. JP 2003-087180 can achieve a certain object of reducing power consumption of the called station (slave device), reduction of power consumption on the master side has not been considered. Further, the technology disclosed in Japanese Patent Unexamined Publication No. 2014-082615 is intended to reduce the power consumption for a transmission operation on the master side, in addition to reduction of the power consumption of the wireless slave device (locator), but reduction of power consumption of operations, including a reception operation, has not been considered.

SUMMARY OF THE INVENTION

The present invention has been made to solve the aforementioned problems of the related art, and a main object thereof is to provide a wireless communication system capable of greatly reducing power consumption of a wireless slave device and a wireless master device to satisfy the demand for simple installation at a low cost.

A wireless communication system of the present invention is a wireless communication system including a slave device, and a master device wirelessly connected to the slave device, in which the master device includes: a master device wireless communicator that performs wireless communication with the slave device; a master device power supply that supplies power to each unit of the master device; a master device interrupt detector that detects various interrupts; and a master device controller that controls the entire master device, the master device interrupt detector supplies power from the master device power supply to each unit of the master device when detecting the interrupt, and the master device controller performs control to continuously transmit a capture signal to the slave device that waits for reception at a reception timing of a first predetermined interval, via the master device wireless communicator for time longer than the first predetermined interval when the detected interrupt is an interrupt that requests signal transmission to the slave device, and control to wait for a capture signal transmitted from the slave device through the master device wireless communicator when the detected interrupt is a timer interrupt occurring at a second predetermined interval.

According to the present invention, it is possible to provide a wireless communication system capable of greatly reducing power consumption of a wireless slave device and a wireless master device through the configuration described above.

DETAILED DESCRIPTION OF THE PREFERRED EMBODIMENTS

Hereinafter, embodiments of the present invention will be described with reference to the drawings.

First Exemplary Embodiment

Figure 1:
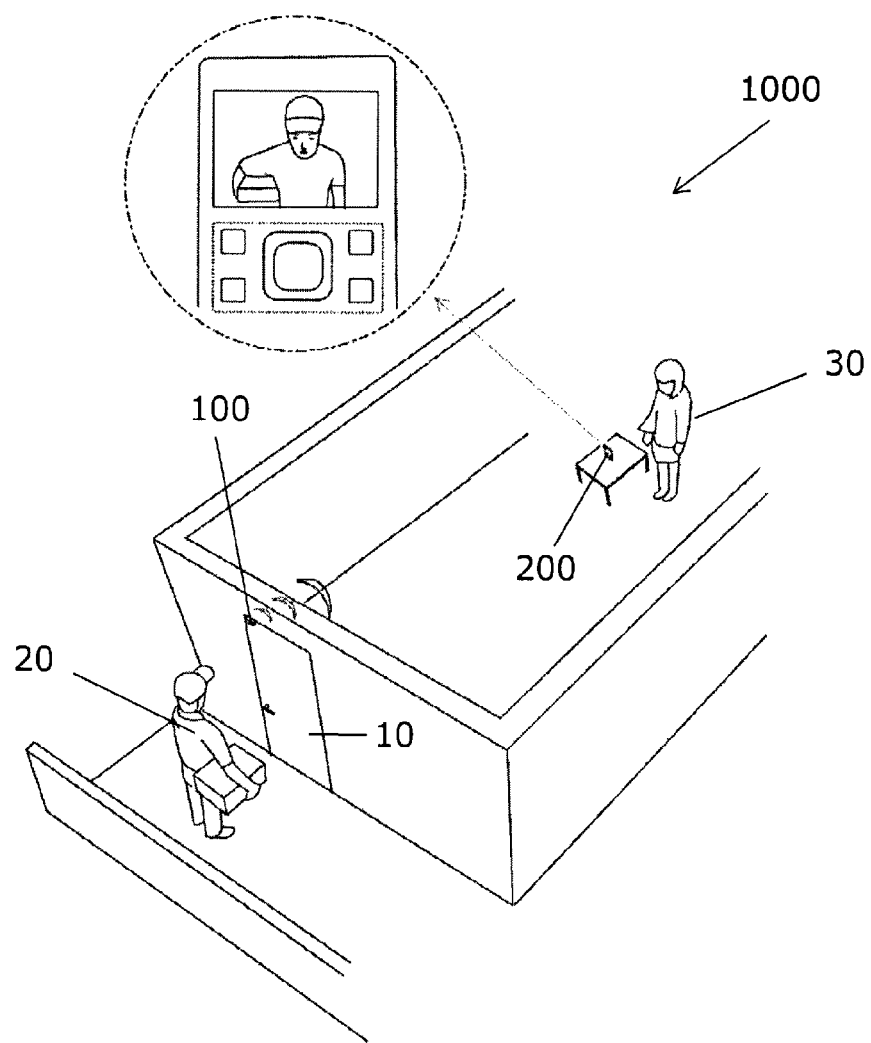
FIG. 1 is a schematic diagram illustrating an overview of a wireless communication system in a first exemplary embodiment.

FIG. 1 is a schematic view illustrating an overview of wireless communication system 1000 according to a first exemplary embodiment. Wireless communication system 1000 includes camera device 100, and monitor device 200. Camera device 100 and monitor device 200 communicate with each other via a wireless line.

Camera device 100 is arranged on the external (outdoor) side relative to entrance door 10 near entrance door 10 of a house, and installed to be hooked to an upper portion of entrance door 10. Camera device 100 images an outdoor space (for example, visitor 20, and the outdoor vicinity of entrance door 10).

Monitor device 200 is installed on the residential space (indoor) side relative to entrance door 10, and displays an image received from camera device 100 at a predetermined timing. The predetermined timing is, for example, a timing at which resident 30 hearing a chime sound or a knocking sound at entrance door 10 generated by visitor 20 operates monitor device 200 to confirm visitor 20.

Display by monitor device 200 is confirmed by resident 30. Monitor device 200 may be fixed in a predetermined indoor position (for example, an indoor wall) or may be suitably held and moved by indoor resident 30. FIG. 1 illustrates a case in which monitor device 200 is placed on an indoor table.

Figure 2:
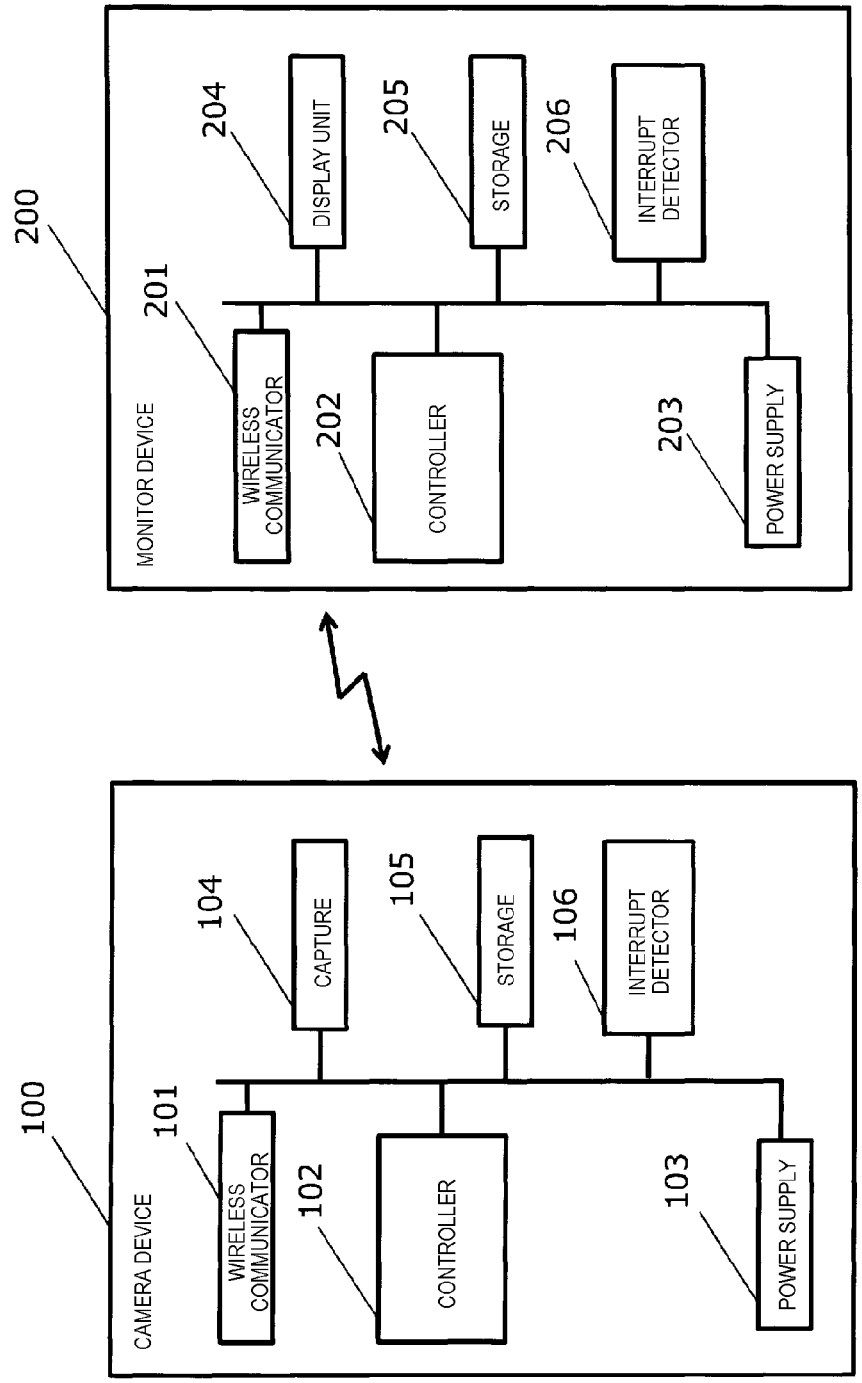
FIG. 2 is a block diagram illustrating an example of a configuration of the wireless communication system in the first exemplary embodiment.

FIG. 2 is a block diagram illustrating an example of a configuration of wireless communication system 1000 according to the first exemplary embodiment.

Configuration of the Camera Device

Camera device 100 includes wireless communicator 101, controller 102, power supply 103, capture 104, storage 105, and interrupt detector 106.

Wireless communicator 101 communicates with monitor device 200 over a wireless line. A communication scheme in wireless communicator 101 includes, for example, digital enhanced cordless telecommunication (DECT), a wireless local area network (LAN), or Zigbee (registered trademark).

Wireless communicator 101 transmits a captured image to monitor device 200. Accordingly, indoor resident 30 can visually recognize visitor 20 present in the vicinity of entrance door 10. Further, wireless communicator 101 receives voice of visitor 20 using a microphone (not illustrated) of camera device 100, and transmits audio information including the voice of visitor 20 to monitor device 200. Further, wireless communicator 101 receives audio information including voice of resident 30 from monitor device 200. Accordingly, outdoor visitor 20 and indoor resident 30 can talk to each other.

Controller 102 includes, for example, a read only memory (ROM), a random access memory (RAM), and a central processing unit (CPU). For example, the CPU executes a program held in the ROM to realize various functions of controller 102.

Controller 102 performs various controls, operations, and determinations for entire camera device 100. Controller 102 performs an operation process for controlling each unit of camera device 100.

Power supply 103 supplies power to each unit in order to operate camera device 100. In power supply 103, power may be input from an AC power supply or an AC adapter. Power supply 103 may include a battery such as a primary battery or a secondary battery in consideration of installation.

Capture unit 104 images a predetermined outdoor space. An image captured by capture 104 (captured image) includes, for example, a moving image and a still image, and visitor 20, a passerby, a suspicious person, an object other than a human, and the like are included in the captured image.

Storage unit 105 includes a flash memory or the like, and stores, for example, device information, such as an identification number, and setup information of camera device 100, state information of monitor device 200, and a captured image before transmission to monitor device 200.

Interrupt detector 106 detects key interrupt of a button or the like included in camera device 100, interrupt by a timer, and interrupt by various events. The detection of the interrupt includes detection by hardware and detection by software.

Interrupt detector 106 also has a function of controlling supply of power from power supply 103 to each unit in order to realize ultra-low power consumption. For example, on the circuit, interrupt detector 106 is located between power supply 103 and each unit such as controller 102, and only interrupt detector 106 is operated at all times by the low power of power supply 103. Interrupt detector 106 turns the switching element ON/OFF in order to supply power to each unit based on the detection of a predetermined interrupt.

Configuration of the Monitor Device

Monitor device 200 includes wireless communicator 201, controller 202, power supply 203, display unit 204, storage 205, and interrupt detector 206.

Wireless communicator 201 communicates with camera device 100 via a wireless line. A communication scheme in wireless communicator 201 includes, for example, DECT, a wireless LAN, or Zigbee (registered trademark).

Wireless communicator 201 receives the captured image from camera device 100. Accordingly, indoor resident 30 can visually recognize visitor 20 present in the vicinity of entrance door 10. Further, wireless communicator 201 receives the audio information including voice of visitor 20 from camera device 100. Further, wireless communicator 201 receives the voice of resident 30 using a microphone (not illustrated) of monitor device 200, and transmits the audio information including the voice of resident 30 to camera device 100. Accordingly, outdoor visitor 20 and indoor resident 30 can talk to each other.

Controller 202 includes, for example, ROM, RAM, and a CPU. For example, the CPU executes a program held in the ROM to realize various functions of controller 202.

Controller 202 performs various controls, operations, and determinations for entire monitor device 200. Controller 202 performs an operation process for controlling each unit of monitor device 200.

Power supply 203 supplies power to each unit in order to operate monitor device 200. In power supply 203, power may be input from an AC power supply or an AC adapter. Power supply 203 may include a battery such as a primary battery or a secondary battery in consideration of installation.

The display unit 204 includes, for example, a liquid crystal display (LCD), and displays various images. The image includes, for example, a moving image and a still image, and includes the captured image from camera device 100, and an image for operating monitor device 200.

Storage unit 205 includes a flash memory or the like, and stores various images, voices, or other management information. The image includes, for example, a moving image, and a still image, and includes a captured image from camera device 100, and an image for operating monitor device 200. The voice includes, for example, voice of a fixed message generated from monitor device 200.

The other management information includes, for example, password information for preventing various setup information of monitor device 200 from being forcibly changed.

Interrupt detector 206 detects key interrupt of a button or the like included in monitor device 200, interrupt by a timer, and interrupt by various events. The detection of the interrupt includes detection by hardware and detection by software.

Interrupt detector 206 also has a function of controlling supply of power from power supply 203 to each unit in order to realize ultra-low power consumption. For example, on the circuit, interrupt detector 206 is located between power supply 203 and each unit such as controller 202, and only interrupt detector 206 is operated at all times by low power of power supply 203. Interrupt detector 206 turns the switching element ON/OFF in order to supply power to each unit based on the detection of a predetermined interrupt.

Figure 3:
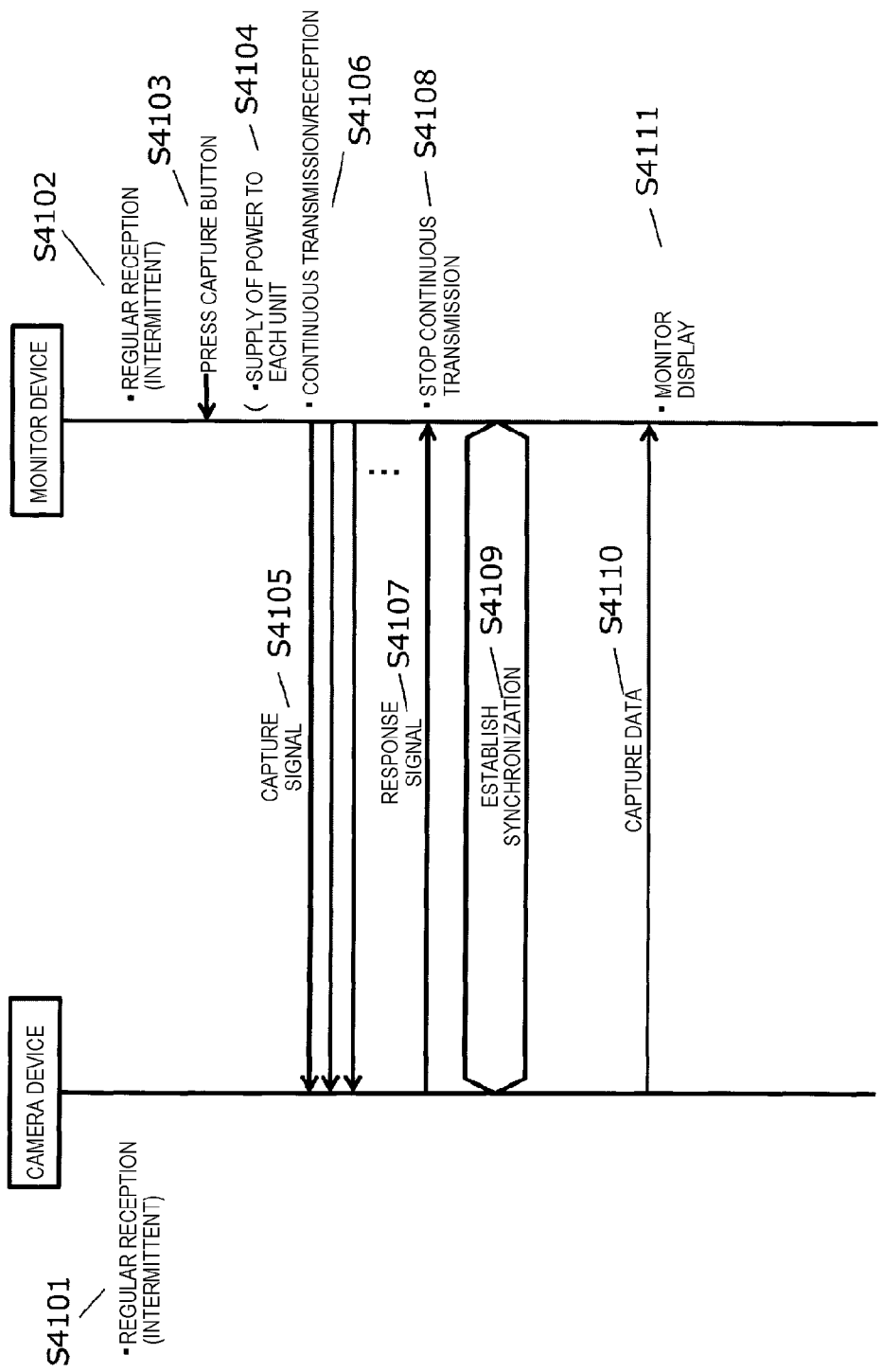
FIG. 3 is a sequence diagram illustrating an overview of an operation when a capture button is pressed in the wireless communication system in the first exemplary embodiment.

FIG. 3 is a sequence diagram illustrating an overview of an operation in capture button is pressed in wireless communication system 1000 according to the first exemplary embodiment. An operation in an example of realization of ultra-low power consumption and a request for a captured image according to this sequence will be described with appropriate reference to FIG. 2.

Realization of Ultra-Low Power Consumption

In wireless communication system 1000 of this exemplary embodiment, the most characteristic point is that camera device 100 and monitor device 200 stop the supply of power from power supply 103 and power supply 203 to the respective units for a predetermined period of time (hereinafter, the period during this stop is referred to as a "sleep period").

Camera device 100 performs regular reception (intermittent reception) (S4101). For example, interrupt detector 106 described with reference to FIG. 2 turns ON the switching element for supply of power from power supply 103 to each unit when the interrupt has occurred due to the timer at predetermined intervals (for example, 2.56 seconds). Wireless communicator 101 to which the power has been supplied performs a reception operation and, accordingly, camera device 100 performs regular reception.

Similarly, monitor device 200 performs regular reception in asynchronization with camera device 100 (S4102). In monitor device 200, for example, interrupt detector 206 described with reference to FIG. 2 turns ON the switching element that supplies the power from the power source 203 to each unit when the interrupt has occurred due to the timer at predetermined intervals (for example, 2.56 seconds). When wireless communicator 201 to which the power has been supplied performs a reception operation, monitor device 200 performs the regular reception.

Sequence in Example of Request for Captured Image

In monitor device 200, when a capture button (not illustrated) is pressed (S4103), supply of power from power supply 203 to each unit is started in the sleep period (S4104). For example, interrupt detector 206 described with reference to FIG. 2 detects the interrupt by pressing of the capture button, and turns ON the switching element that supplies the power from power supply 203 to each unit.

Wireless communicator 201 to which the power has been supplied transmits a capture signal for performing a synchronization process with camera device 100 (S4105). In this case, wireless communicator 201 continuously transmits the capture signal at predetermined intervals (for example, 2.56 seconds) of the regular reception of camera device 100, and performs reception of the response signal (S4106). Details of the operation of the continuous transmission and reception will be described below.

In camera device 100, when wireless communicator 101 receives the capture signal through the regular reception, wireless communicator 101 transmits a response signal as a response to monitor device 200 (S4107). Wireless communicator 101 starts the synchronization process based on synchronization information included in the capture signal under the control of controller 102.

On the other hand, in monitor device 200, when wireless communicator 201 receives the response signal from camera device 100, wireless communicator 201 stops the continuous transmission of the capture signal (S4108), and starts a synchronization process.

When synchronization is established between camera device 100 and monitor device 200 (S4109), camera device 100 transmits capture data (captured image) captured by capture 104 to monitor device 200 using wireless communicator 101 (S4110).

When wireless communicator 201 receives the image data from camera device 100, monitor device 200 displays the images sent as image data on the display unit 204 (S4111).

As described above, camera device 100 and monitor device 200 completely stop the supply of power from power supply 103 and power supply 203 to each unit for a predetermined period of time. Moreover, since the supply of power to each unit is performed in response to the interrupt by interrupt detector 106 and interrupt detector 206, ultra-low power consumption can be realized.

In particular, when camera device 100 is performing the regular reception (that is, camera device 100 is also able to perform transmission to monitor device 200), monitor device 200 that is a master device does not normally stop the supply of power to each unit (that is, does not enter a state that monitor device 200 does not transmit a synchronization signal or receive a response signal to the synchronization signal), but since monitor device 200 can operate with no problem even when the supply of power to each unit is stopped by the above-described configuration, ultra-low power consumption can be realized, unlike the related art.

Operation of Continuous Transmission and Reception

Hereinafter, details of a continuous transmission and reception operation in monitor device 200 described in step S4106 of FIG. 3 will be described while showing transmission and reception timings of signals between monitor device 200 and camera device 100. FIG. 3 will be appropriately referred to.

Figure 4:
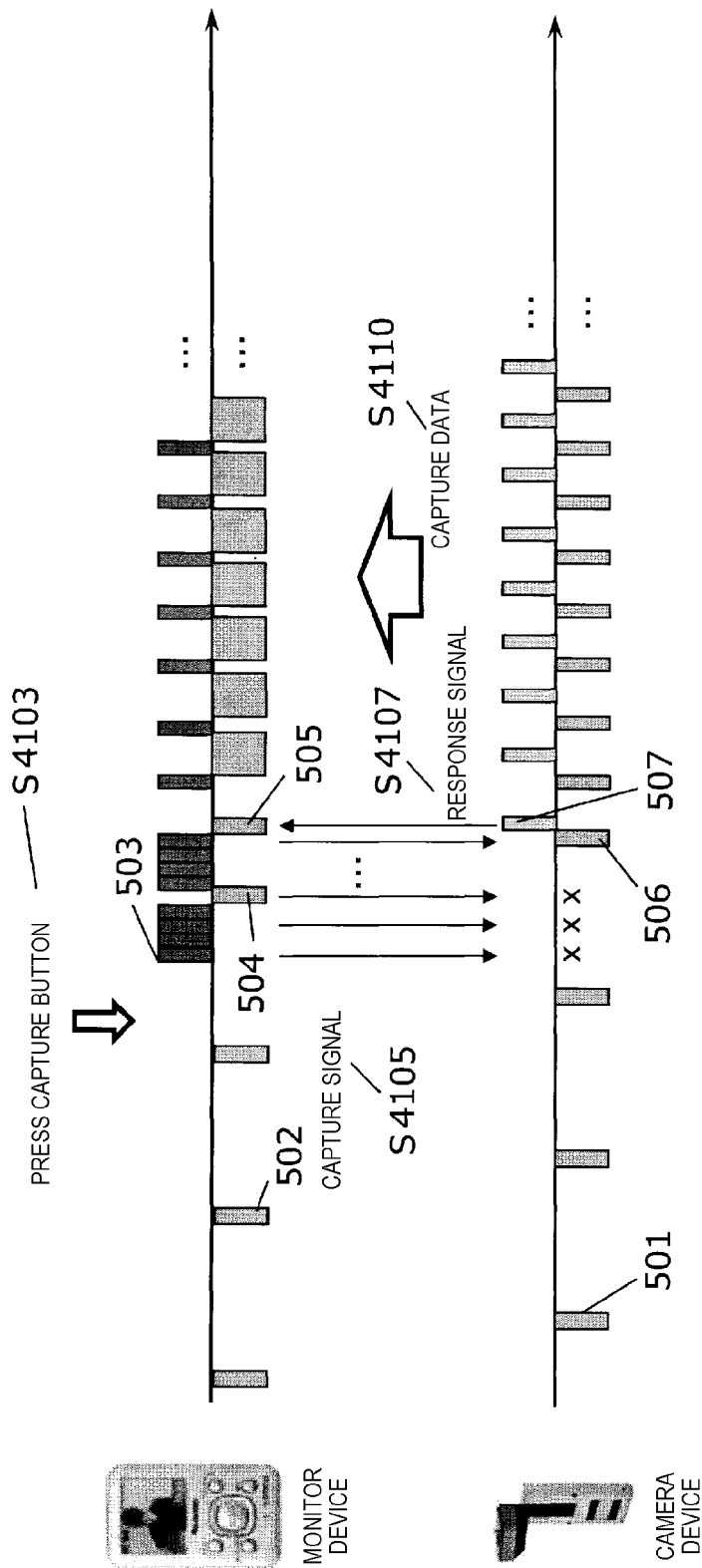
FIG. 4 is a diagram illustrating signal transmission and reception between a camera device and a monitor device when the capture button is pressed in the first exemplary embodiment.

FIG. 4 is a diagram illustrating signal transmission and reception between camera device 100 and monitor device 200 when the capture button is pressed in the first exemplary embodiment. As illustrated in FIG. 4, when camera device 100 performs the regular reception described in step S4101, reception period 501 of a predetermined time S (for example, 0.8 milliseconds) is set at predetermined time intervals T (for example, 2.56 seconds).

Similarly, when monitor device 200 performs the regular reception described in step S4102, reception period 502 of a predetermined time S (for example, 0.8 milliseconds) is set at predetermined time intervals T (for example, 2.56 seconds).

Camera device 100 and monitor device 200 operate asynchronously. Thus, in the above-described example, time intervals T are the same, but may be separate.

When the capture button described in step S4103 is pressed, monitor device 200 transmits the capture signal described in step S4105 in a period continuous from transmission period 503. A mark x of an arrival destination of the capture signal on camera device 100 side in FIG. 4 indicates that the capture signal cannot be received at timings of the regular reception at predetermined time intervals T after reception period 501 of camera device 100.

Monitor device 200 sets a period in which monitor device 200 continuously transmits the capture signal to be equal to the time interval T of the regular reception described above, or sets the period to be longer than the time interval T so that the capture signal is reliably received by camera device 100.

However, when the period in which monitor device 200 continuously transmits the capture signal is long, power consumption increases. Accordingly, for example, several reception periods 504 and 505 are provided in the continuous transmission.

For example, monitor device 200 stops the continuous transmission if monitor device 200 does not receive the response signal described in step S4107 in reception period 504, and continues the continuous transmission if monitor device 200 does not receive the response signal, and performs the same determination in the next reception period 505. FIG. 4 illustrates an example in which the capture signal is received in reception period 506 of the regular reception of camera device 100, and the response signal transmitted in a subsequent transmission period 507 is received in reception period 505 described above.

Thus, in monitor device 200, by providing several reception periods within the continuous transmission of the capture signal, unnecessary continuous transmission after a timing at which monitor device 200 can receive the response signal is suppressed and power saving is achieved.

Then, as described with reference to FIG. 3, the synchronization is established between camera device 100 and monitor device 200, and the capture data described in step S4110 is transmitted from camera device 100 to monitor device 200 at a synchronized timing of transmission and reception.

As described above, according to wireless communication system 1000, it is possible to provide a period in which the power is not supplied to each unit until next reception of the regular reception in camera device 100 and until next reception of the regular reception in monitor device 200 or until pressing of the capture button is detected in monitor device 200. Thus, it is possible to greatly reduce power consumption of camera device 100 (wireless slave device) and monitor device 200 (wireless master device).

Further, according to wireless communication system 1000, if monitor device 200 receives the response signal from camera device 100 when continuously transmitting the capture signal, monitor device 200 can stop the continuous transmission and perform the synchronization process with camera device 100. Thus, it is possible to further reduce the power consumption of monitor device 200 (wireless master device).

Figure 5:
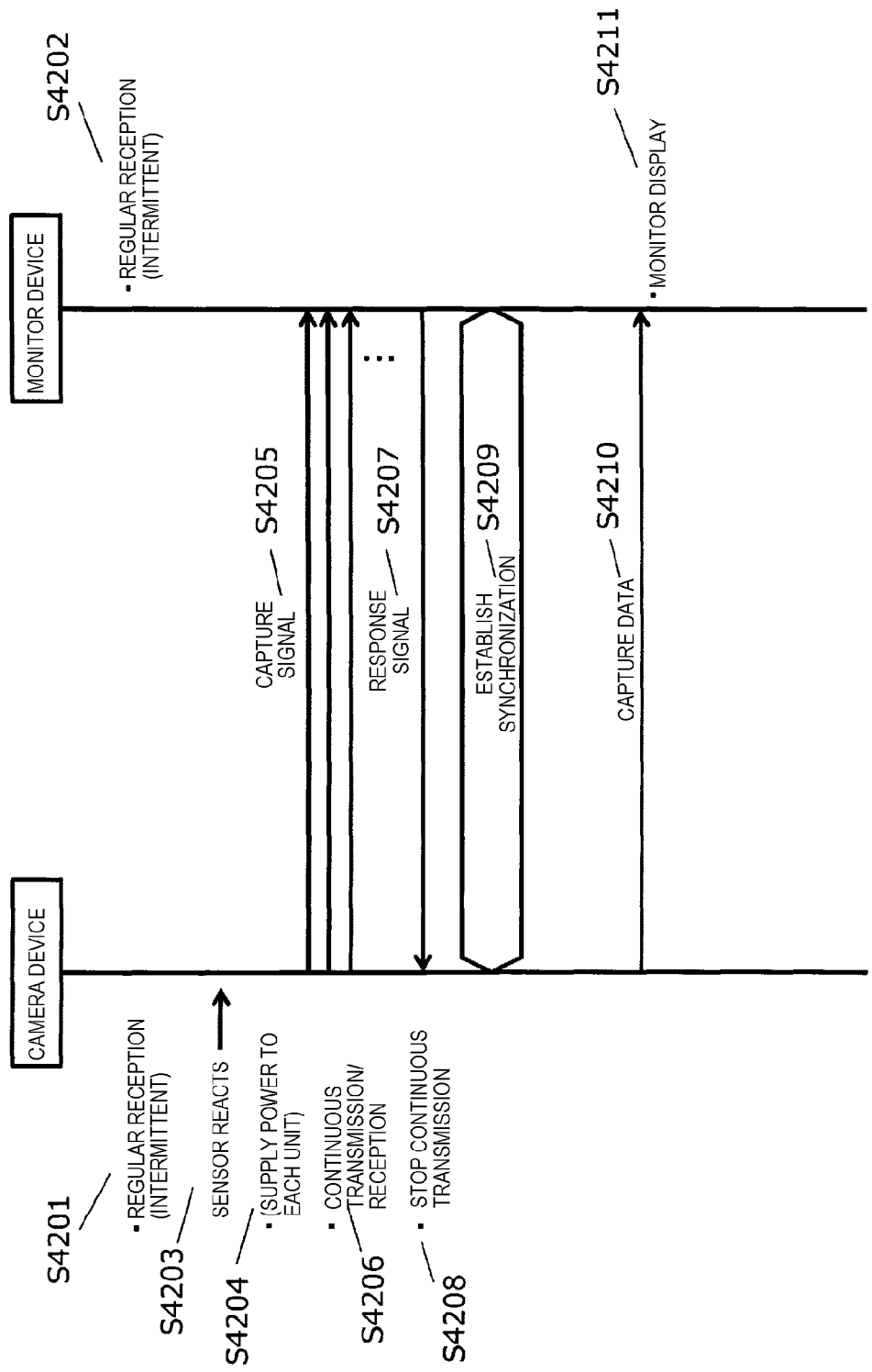
FIG. 5 is a sequence diagram illustrating an overview of an operation when a sensor reacts in the wireless communication system in the first exemplary embodiment.

FIG. 5 is a sequence diagram illustrating an overview of an operation at the time of sensor reaction of wireless communication system 1000 in the first exemplary embodiment. An operation in an example in which the sensor reacts will be described according to this sequence with appropriate reference to FIGS. 2 and 3. Portions overlapping with the description of the sequence diagram of FIG. 3 will be described in a simplified manner.

Camera device 100 performs regular reception (intermittent reception) (S4201). Similarly, monitor device 200 performs the regular reception in asynchronization with camera device 100 (S4202).

Sequence in Example in which Sensor Reacts

In camera device 100, when a human sensor (not illustrated) reacts (S4203), supply of power from power supply 103 to each unit is started in the sleep period (S4204). For example, interrupt detector 106 described with reference to FIG. 2 detects the interrupt by the human sensor, and turns ON the switching element that supplies the power from power supply 103 to each unit.

Wireless communicator 101 to which the power has been supplied, transmits a capture signal for performing a synchronization process with monitor device 200 (S4205). In this case, wireless communicator 101 continuously transmits the capture signal according to a predetermined interval for regular reception of monitor device 200 (for example, 2.56 seconds), and performs reception of the response signal (S4206).

In monitor device 200, wireless communicator 201 receives the capture signal through the regular reception, wireless communicator 201 transmits a response signal as a response to camera device 100 (S4207). Wireless communicator 201 starts the synchronization process based on synchronization information included in the capture signal under the control of controller 202.

On the other hand, when wireless communicator 101 receives the response signal from the monitor device 200, camera device 100 stops the continuous transmission of the capture signal (S4208) and starts a synchronization process.

When synchronization is established between camera device 100 and monitor device 200 (S4209), camera device 100 transmits capture data (captured image) captured by capture 104 to monitor device 200 using wireless communicator 101 (S4210).

When wireless communicator 201 receives the image data from camera device 100, monitor device 200 displays the images sent as image data on the display unit 204 (S4211).

As described above, camera device 100 and monitor device 200 completely stop the supply of power from power supply 103 and power supply 203 to each unit for a predetermined period. Moreover, since the supply of power to each unit is performed in response to the interrupt by interrupt detector 106 and interrupt detector 206, ultra-low power consumption can be realized.

Operation of Continuous Transmission and Reception

Hereinafter, details of a continuous transmission and reception operation in camera device 100 described in step S4206 of FIG. 5 will be described while showing transmission and reception timings of signals between monitor device 200 and camera device 100. FIG. 5 will be appropriately referred to.

Figure 6:
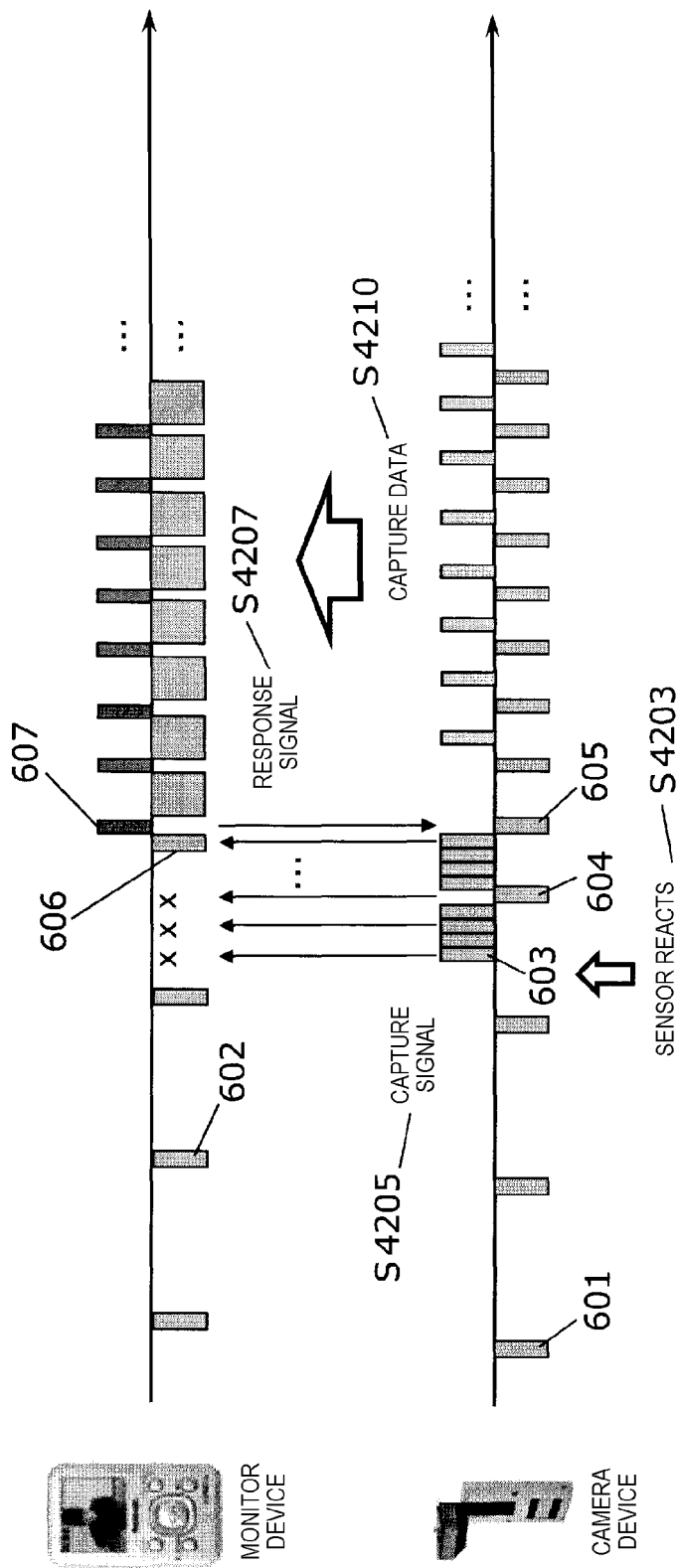
FIG. 6 is a diagram illustrating signal transmission and reception between the camera device and the monitor device when the sensor reacts in the first exemplary embodiment.

FIG. 6 is a diagram illustrating signal transmission and reception between camera device 100 and monitor device 200 when the sensor reacts in the first exemplary embodiment. As illustrated in FIG. 6, in camera device 100, a reception period 601 is set as described with reference to FIG. 5, and in monitor device 200, a reception period 602 is set in asynchronization with camera device 100, as described with reference to FIG. 5.

When there is a reaction of the human sensor described in step S4203, camera device 100 transmits the capturing signal described in step S4205 in a period continuous from transmission period 603.

Camera device 100 sets a period in which camera device 100 continuously transmits the capture signal to be equal to the time interval T of the regular reception described above, or sets the period to be longer than the time interval T so that the capture signal is reliably received by monitor device 200. However, when the period in which camera device 100 continuously transmits the capture signal is long, power consumption increases. Accordingly, for example, several reception periods 604 and 605 are provided in the continuous transmission.

For example, FIG. 6 illustrates an example in which the capture signal is received in a reception period 606 of the regular reception of the monitor device 200, and the response signal transmitted in a subsequent transmission period 607 is received in the reception period 605 described above.

Thus, in camera device 100, by providing several reception periods within the continuous transmission of the capture signal, unnecessary continuous transmission after a timing at which monitor device 200 can receive the response signal is suppressed and power saving is achieved.

Then, as described with reference to FIG. 5, the synchronization is established between camera device 100 and monitor device 200, and the capture data described in step S4210 is transmitted from camera device 100 to monitor device 200 at a synchronized timing of transmission and reception.

As described above, according to wireless communication system 1000, it is possible to provide a period in which the power is not supplied to each unit until next reception of the regular reception in camera device 100 or until the reaction of the human sensor is detected and until next reception of the regular reception in monitor device 200. Thus, it is possible to greatly reduce power consumption of camera device 100 (wireless slave device) and monitor device 200 (wireless master device).

Further, according to wireless communication system 1000, if monitor device 200 receives the response signal from camera device 100 when continuously transmitting the capture signal, monitor device 200 can stop the continuous transmission and perform the synchronization process with camera device 100. Thus, it is possible to further reduce the power consumption of monitor device 200 (wireless master device).

Second Exemplary Embodiment

In a second exemplary embodiment, an example of an operation in which re-transition to regular reception is performed after the synchronization process starts in an example when the capture button is pressed and when the sensor reacts with respect to an example of an operation of wireless communication system 1000 shown in the first exemplary embodiment will be described.

When Capture Button is Pressed

Figure 7:
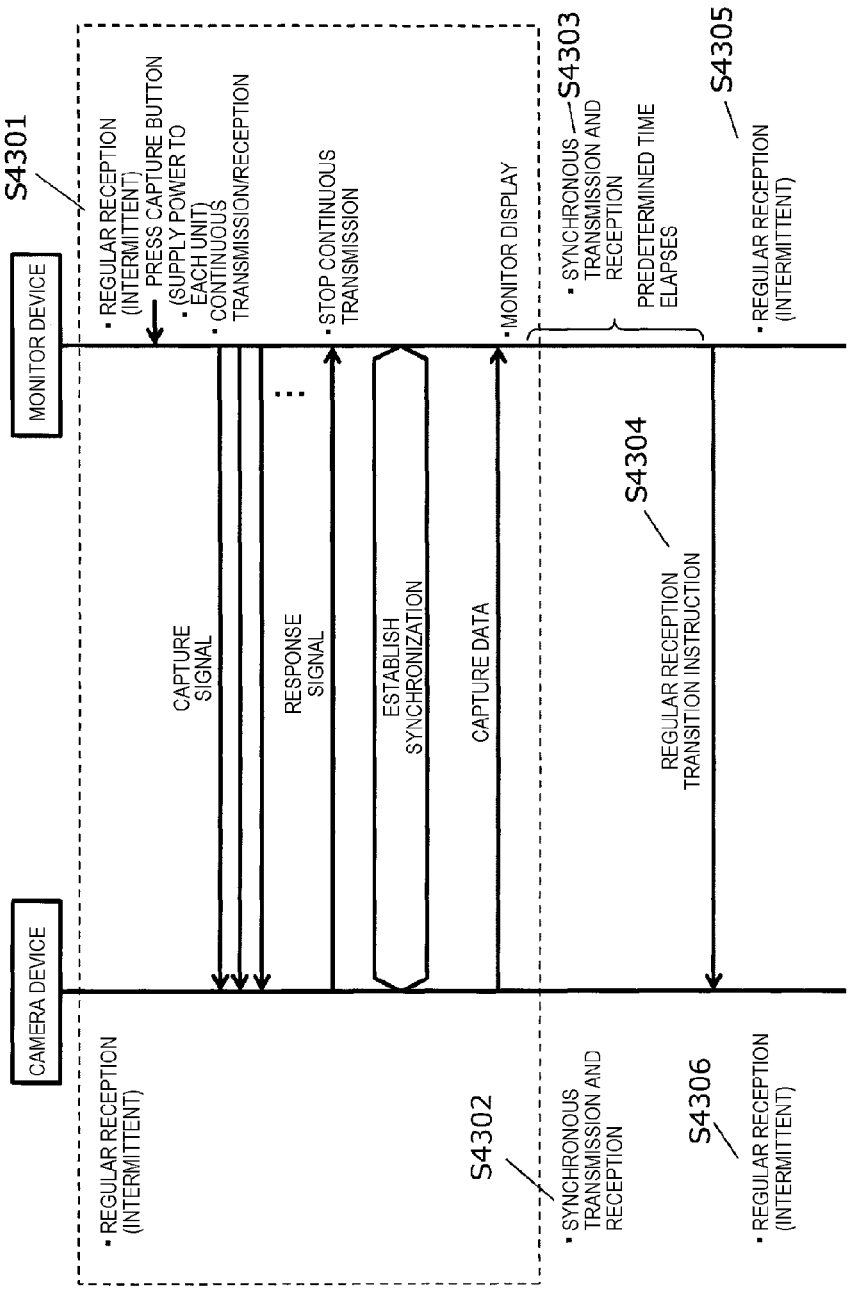
FIG. 7 is a sequence diagram illustrating an overview of an operation when a capture button is pressed in a wireless communication system in a second exemplary embodiment.

FIG. 7 is a sequence diagram illustrating an overview of an operation when the capture button is pressed in the wireless communication system in the second exemplary embodiment. Description will be given according to this sequence with appropriate reference to FIG. 3.

In FIG. 7, a sequence of step S4301 surrounded by a rectangular dotted line is exactly the same as that of steps S4101 to S4111 in FIG. 3. Camera device 100 that has transmitted the capture data and monitor device 200 that has performed monitor display in the sequence of step S4301 are in a state of synchronous transmission and reception (S4302 and S4303).

In this case, when camera device 100 forcibly returns to the regular reception operation before capture signal reception in order to reduce power consumption, monitor device 200 cannot determine whether to transmit the capture signal once (camera device 100 is in a synchronized transmission and reception state) or to transmit the capture signal as a continuous signal (camera device 100 is in a regular reception state).

After the monitor device 200 performs the monitor display of step S4301, the monitor device 200 transmits a regular reception transition instruction signal to camera device 100 after a predetermined time elapses (S4304). Monitor device 200 also transitions to a regular reception operation (S4305).

On the other hand, camera device 100 that has received the regular reception transition instruction signal transitions to a regular reception operation (S4306).

When Sensor Reacts

Figure 8:
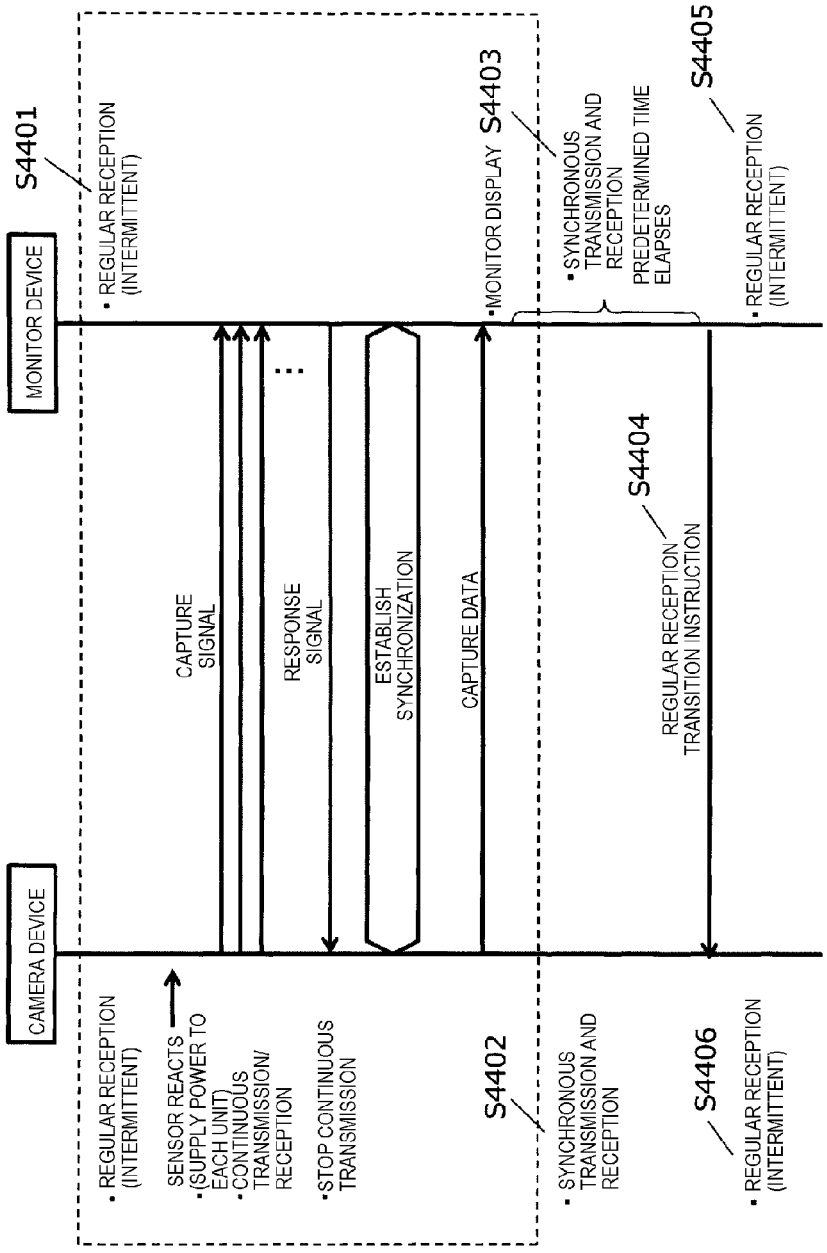
FIG. 8 is a sequence diagram illustrating an overview of an operation when a sensor reacts in the wireless communication system in the second exemplary embodiment.

FIG. 8 is a sequence diagram illustrating an overview of an operation at the time of a sensor reaction of the wireless communication system in the second exemplary embodiment. Description will be given according to this sequence with appropriate reference to FIG. 5.

In FIG. 8, a sequence of step S4401 surrounded by a rectangular dotted line is exactly the same as that of steps S4201 to S4211 in FIG. 5. Camera device 100 that has transmitted the capture data and monitor device 200 that has performed monitor display in the sequence of step S4401 are in a state of synchronous transmission and reception (S4402 and S4403).

Similar to when the capture button is pressed, in this case, when camera device 100 forcibly returns to the regular reception operation before capture signal reception in order to reduce power consumption, monitor device 200 cannot determine whether to transmit the capture signal once (camera device 100 is in a synchronized transmission and reception state) or to transmit the capture signal as a continuous signal (camera device 100 is in a regular reception state).

After the monitor device 200 performs the monitor display of step S4401, the monitor device 200 transmits a regular reception transition instruction signal to camera device 100 after a predetermined time elapses (S4404). Monitor device 200 also transitions to a regular reception operation (S4405).

On the other hand, camera device 100 that has received the regular reception transition instruction signal transitions to a regular reception operation (S4406).

As described above, since camera device 100 returns to the regular reception operation before the capture signal reception in response to the reception of the regular reception transition instruction signal from monitor device 200, camera device 100 can operate with no problem even when camera device 100 transitions to the regular reception, and thus, ultra-low power consumption can be realized, unlike the related art.

Further, even when the transition to the synchronization state is performed due to an event on camera device 100 side, if the regular reception transition instruction signal is transmitted from the monitor device 200, ultra-low power consumption can be realized without complicating the process.

Although not illustrated in FIG. 8, the regular reception transition instruction signal may be transmitted from camera device 100, and ultra-low power consumption can be realized without complicating the process, similar to the above description.

Moreover, although the process is complicated, the regular reception transition instruction signal may be transmitted from either camera device 100 or monitor device 200. In this case, a system in which a side transmitting the capture signal operates as a "master device" (in a sense of transmission of a capture signal including synchronization information) can be realized.

Furthermore, since the state of the other side can be recognized through the transmission and reception of the regular reception transition instruction signal, the operation of camera device 100 and monitor device 200 can be stabilized, and high reliability in use of wireless communication system 1000 can be obtained.

While wireless communication system 1000 including camera device 100 and monitor device 200 has been described in the first and second exemplary embodiments, the present invention is not limited thereto, and is also effective in a radio wave remote control, a keyless entry system, or home safety related wireless communication system.

The present invention is useful in a wireless communication system capable of greatly reducing power consumption of a wireless slave device and a wireless master device.

What is claimed is:

1. A door phone system comprising:
  a camera as a slave device, and
  a monitor as a master device wirelessly connected to the camera,
  wherein the monitor includes
    a monitor wireless communicator that performs wireless communication with the camera, including receiving a captured image from the camera;
    a monitor power supply that supplies power to each component of the monitor;
    a monitor interrupt detector that detects various interrupts; and
    a monitor controller that controls the monitor,
    wherein the monitor interrupt detector supplies power from the monitor power supply to each component of the monitor when detecting an interrupt, and
    wherein the monitor controller performs
      control to continuously transmit a capture signal, to establish synchronization with the camera, to the camera that waits for reception at a reception timing of a first predetermined interval, via the monitor wireless communicator for a time longer than the first predetermined interval when the detected interrupt is an interrupt that requests signal transmission to the camera, and
      control to wait for a capture signal for establishing synchronization transmitted from the camera through the monitor wireless communicator when the detected interrupt is a timer interrupt occurring at a second predetermined interval.

2. The door phone system of claim 1, wherein the camera includes:
  a camera wireless communicator that performs wireless communication with the monitor;
  a camera power supply that supplies power to each component of the camera;
  a camera interrupt detector that detects various interrupts; and
  a camera controller that controls the camera,
  wherein the camera interrupt detector supplies the power from the camera power supply to each component of the camera when detecting an interrupt, and
  the camera controller performs control to wait for a capture signal transmitted from the monitor through the camera wireless communicator when the detected interrupt is a timer interrupt occurring at the first predetermined interval.

3. The door phone system of claim 2,
  wherein the camera controller performs control to continuously transmit a capture signal to the monitor that waits for reception at a reception timing of the second predetermined interval, via the camera wireless communicator for a time longer than the second predetermined interval when the detected interrupt is an interrupt that requests signal transmission to the monitor.

4. The wireless communication system of claim 1,
  wherein the monitor controller performs control to stop the continuous transmission and perform a synchronization process with the camera if the monitor controller receives a response signal from the camera when the monitor controller continuously transmits the capture signal.

5. A wireless communication method in a wireless door phone system comprising:
  a camera as a slave device, and
  a monitor as a master device wirelessly connected to the camera,
  wherein the monitor performs operations including
    performing wireless communication with the camera, including receiving a captured image from the camera;
  supplying power to each component of the monitor;
  detecting various interrupts; and
  controlling the monitor,
  wherein the detecting various interrupts includes supplying power to each component of the monitor when detecting an interrupt, and
  wherein the controlling the monitor includes performing
  control to continuously transmit a capture signal, to establish synchronization with the camera, to the camera that waits for reception at a reception timing of a first predetermined interval, using the performing wireless communication with the camera for a time longer than the first predetermined interval when the detected interrupt is an interrupt that requests signal transmission to the camera, and
    control to wait for a capture signal for establishing synchronization transmitted from the camera using the performing wireless communication with the camera when the detected interrupt is a timer interrupt occurring at a second predetermined interval.

* * * * *